United States Patent
Shotwell

(12) 
(10) Patent No.: US 6,386,066 B1
(45) Date of Patent: May 14, 2002

(54) VARIABLE STROKE CRANKSHAFT ASSEMBLY

(76) Inventor: Allen M. Shotwell, 207 Simpson Howell Rd., Elizabeth, PA (US) 15037

( * ) Notice: Subject to any disclaimer, the term of this patent is extended or adjusted under 35 U.S.C. 154(b) by 96 days.

(21) Appl. No.: 09/637,310

(22) Filed: Aug. 11, 2000

(51) Int. Cl.⁷ .......................... F16C 3/04; F16H 53/00; F16H 53/06
(52) U.S. Cl. .............. 74/602; 74/595; 74/597; 74/600; 74/570; 74/569; 403/359.1; 403/356
(58) Field of Search .................. 74/595–602, 567, 74/569, 570; 403/359.1, 356; 29/888.08; 418/60, 34

(56) References Cited

U.S. PATENT DOCUMENTS

| | | | |
|---|---|---|---|
| 2,790,332 A | | 4/1957 | Caster et al. ................. 74/571 |
| 3,059,502 A | | 10/1962 | Munz ........................... 74/600 |
| 3,130,603 A | | 4/1964 | Gessner ....................... 74/600 |
| 3,703,839 A | | 11/1972 | Velinde ........................ 74/600 |
| 3,906,842 A | | 9/1975 | Sonobe ........................ 92/13.1 |
| 4,072,448 A | * | 2/1978 | Loyd ............................. 418/60 |
| 4,257,752 A | * | 3/1981 | Fogarty ........................ 418/34 |
| 4,730,511 A | * | 3/1988 | Tsujimura ..................... 74/567 |
| 5,081,884 A | * | 1/1992 | Cheng et al. ................. 74/595 |
| 5,207,120 A | * | 5/1993 | Arnold et al. ........ 29/888.08 X |
| 5,237,892 A | * | 8/1993 | Fry ............................. 74/603 |
| 5,253,546 A | * | 10/1993 | Elrod et al. ........... 74/568 R X |
| 6,276,232 B1 | * | 8/2001 | Yokomichi et al. ....... 74/602 X |

FOREIGN PATENT DOCUMENTS

| | | | | |
|---|---|---|---|---|
| DE | 4211629 A1 | * | 10/1993 | ................. 74/567 |
| JP | 57-173655 | * | 10/1982 | ................. 74/595 |

* cited by examiner

*Primary Examiner*—Vinh T. Luong
(74) *Attorney, Agent, or Firm*—Sand & Sebolt

(57) ABSTRACT

A variable stroke crankshaft assembly includes a drive shaft surrounded by a sleeve. A crankshaft is disposed inside the drive shaft with the longitudinal axis of the crankshaft offset from the longitudinal axis of the drive shaft. A gear projecting outwardly from the crankshaft through a window in a drive shaft engages angled gear teeth on the inner surface of the sleeve allowing sliding movement of the sleeve relative to the drive shaft to rotate the crankshaft. A crankpin is attached to the crankshaft but offset from the rotational axis of the crankshaft. Rotational movement of the crankshaft with respect to the drive shaft thus pivots the crankpin with respect to the rotational axis of the drive shaft creating a crank stroke that may be varied by sliding the sleeve back and forth.

19 Claims, 14 Drawing Sheets

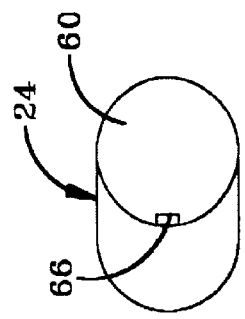
FIG-11
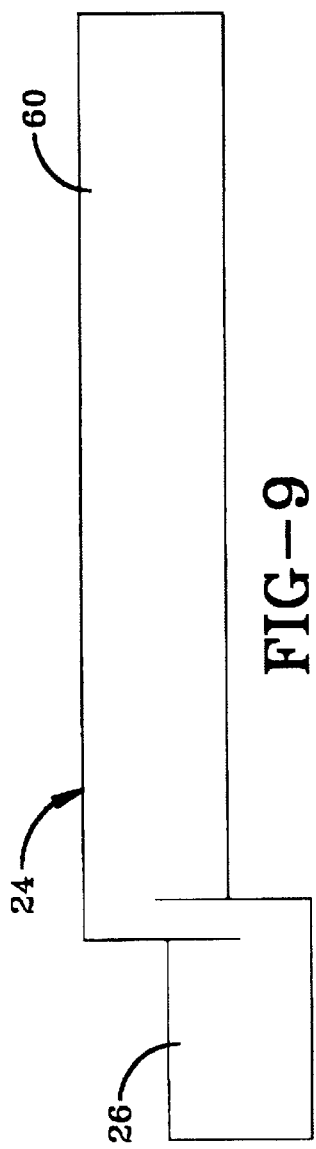
FIG-9
FIG-10
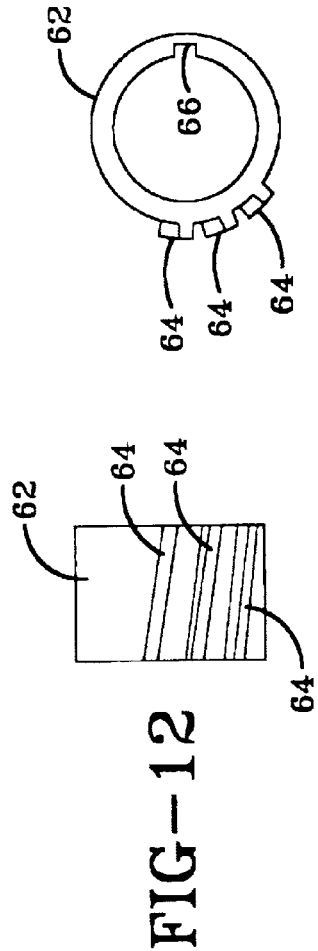
FIG-13
FIG-12

VARIABLE STROKE CRANKSHAFT ASSEMBLY

BACKGROUND OF THE INVENTION

1. Technical Field

The present invention generally relates to crankshafts and, more particularly, to a crankshaft structure having a variable-throw crankpin. Specifically, the present invention relates to a crank shaft having a variable-throw crankpin that may be adjusted while the crankshaft is in use.

2. Background Information

Numerous machines known in the art require an eccentrically rotating crankpin that drives a piston or connecting arm back and forth. Such machines typically include pumps where a plurality of pistons may be connected to a single crankpin to move a larger volume of fluid with the pump. One type of pump using a crankshaft is a hydraulic pump. Hydraulic pumps are typically use to drive hydraulic drive mechanisms. Numerous applications require the delivery of the fluid to the mechanism to be varied. Variable stroke pumps may be used in these applications. These applications generally desire that the adjustment of the drive stroke occur while the crankshaft is in use.

SUMMARY OF THE INVENTION

In view of the foregoing, an objective of the present invention is to provide a variable stroke crankshaft assembly.

Another objective of the present invention is to provide a variable stroke crankshaft assembly that may be adjusted while the crankshaft is in use.

Another objective of the present invention is to provide a variable stroke crankshaft assembly that allows more than one piston or connecting arm to be connected to the crankpin of the assembly.

Another objective of the present invention is to provide a variable stroke crankshaft assembly that encloses all of the components but for the crankpin so that they may be readily lubricated during operation.

Another objective of the present invention is to provide a variable stroke crankshaft assembly that allows the user to adjust the stroke of the pistons by manipulating a hands lever.

These and other objectives of the invention are achieved by a variable stroke crankshaft assembly including a drive shaft having a rotational axis; the drive shaft having a first end and a second end; the drive shaft defining a longitudinal bore having a centerline; the longitudinal bore having a first end and a second end; the first end of the longitudinal bore positioned at the first end of the drive shaft; the centerline of the longitudinal bore being offset from the rotational axis of the drive shaft; the drive shaft defining a window at the second end of the longitudinal bore; a sleeve disposed around a portion of the drive shaft; the sleeve having an inner surface; the sleeve being slidably mounted on the drive shaft; the sleeve defining at least one angled slot on its inner surface; the slot being disposed over the window; a crankshaft disposed in the longitudinal bore of the drive shaft; the crankshaft including at least one gear tooth projecting out of the window of the drive shaft; the gear tooth of the crank shaft being disposed in the at least one angled slot of the sleeve; the crankshaft having a crankpin; the crankpin having a longitudinal axis; and the crankpin being offset from the longitudinal axis of the main shaft of the crankshaft.

Other objectives and advantages of the invention are achieved by a variable stroke crankshaft assembly that includes a drive shaft having a rotational axis; a sleeve surrounding a portion of the drive shaft; the sleeve being slidably mounted on the drive shaft and connected to the drive shaft so that the sleeve rotates with the drive shaft; a crankshaft carried by the drive shaft; the crankshaft having a main shaft having a longitudinal axis that is offset from the rotational axis of the drive shaft; the crankshaft engaging the sleeve; the crankshaft having a crankpin offset from the longitudinal axis of the drive shaft; and sliding movement of the sleeve rotating the crankshaft to pivot the crankpin and thus change the stroke of the crankshaft assembly.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

FIG. 9 is a front elevational view of the crankshaft;

FIG. 10 is a top plan view of the crankshaft of FIG. 9;

FIG. 11 is a right side elevational view of FIG. 10;

FIG. 12 is a front elevational view of the gear of the crankshaft;

FIG. 13 is a right side elevational view of the gear of FIG. 12;

Similar numbers refer to similar parts throughout the specification.

DESCRIPTION OF THE PREFERRED EMBODIMENTS

Figure 1:
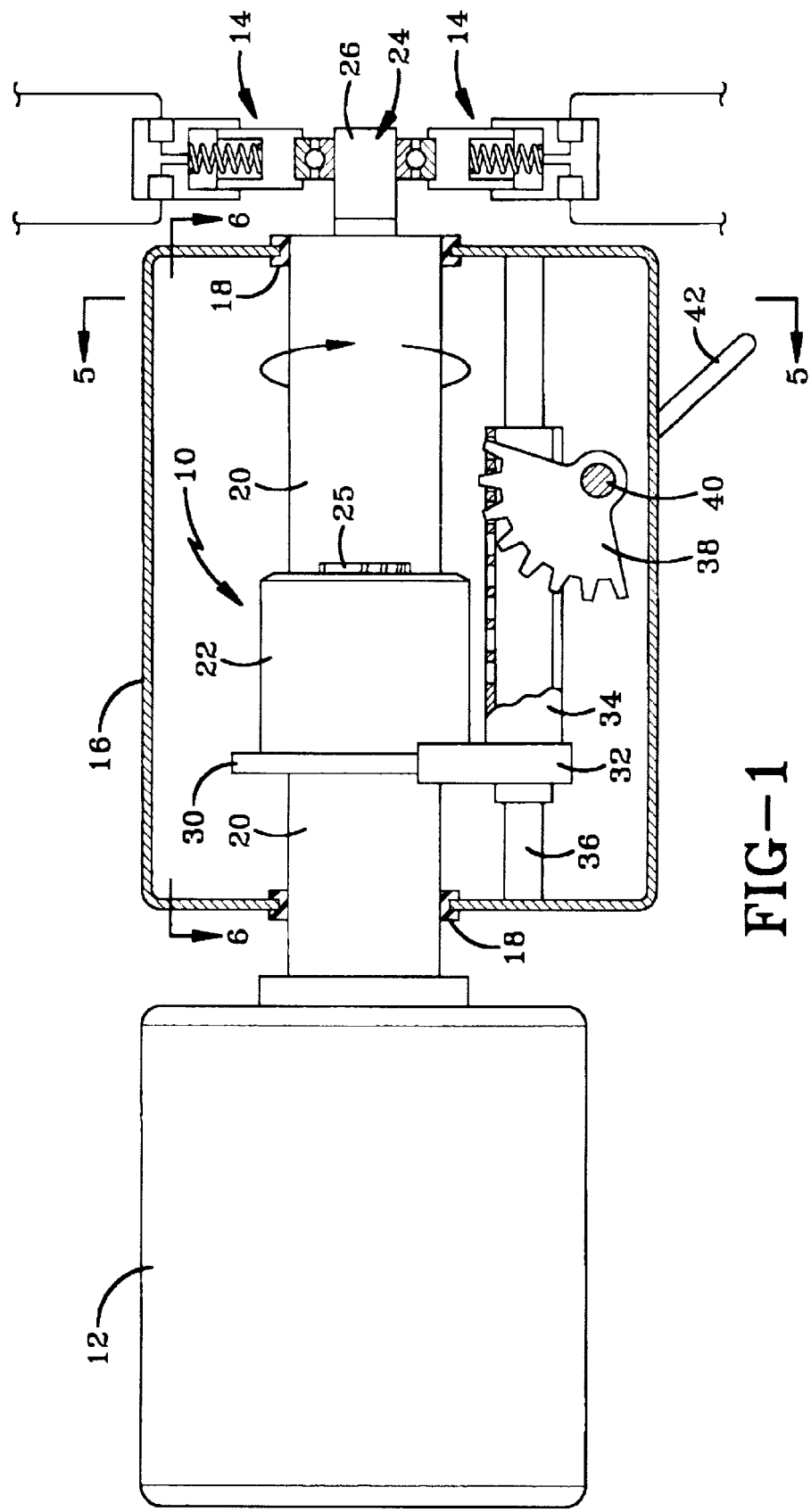
FIG. 1 is a side view, partially in section, of the crankshaft assembly of the present invention connected to a motor and being used to drive a pair of pistons.
Figure 2:
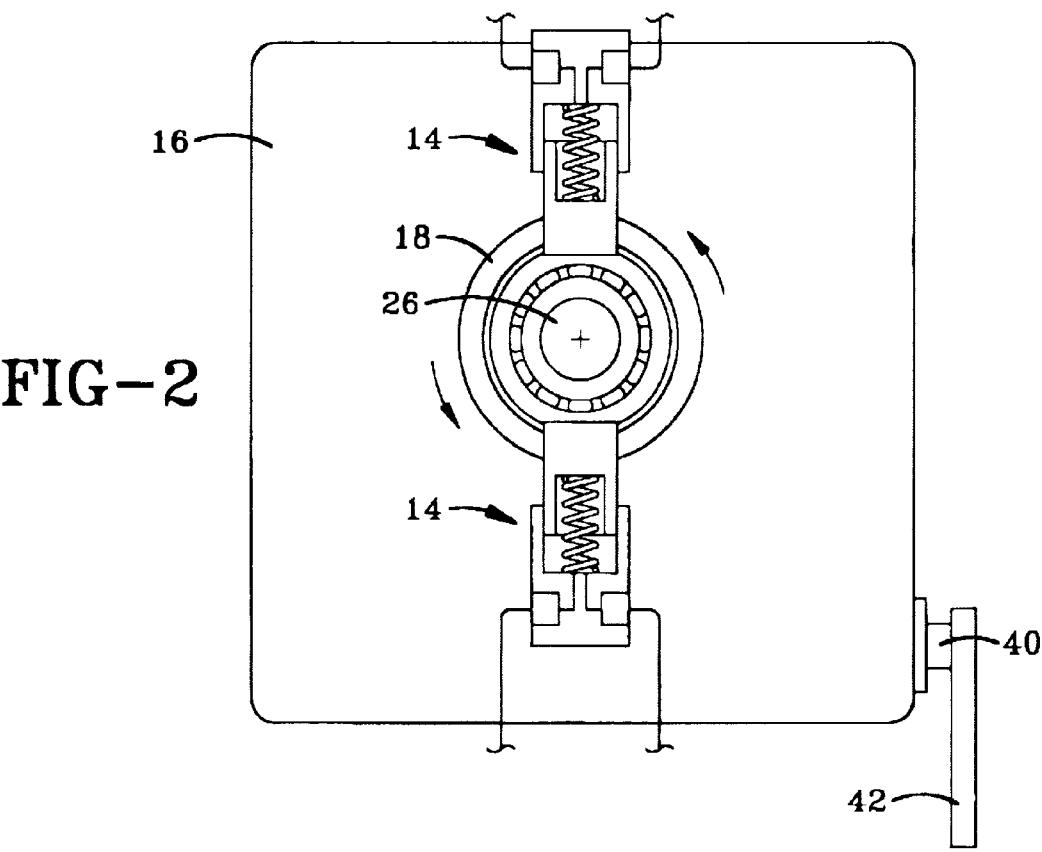
FIG. 2 is a right side elevational view of FIG. 1 showing the crankpin adjusted to a position where it is concentric with the drive shaft.
Figure 4:
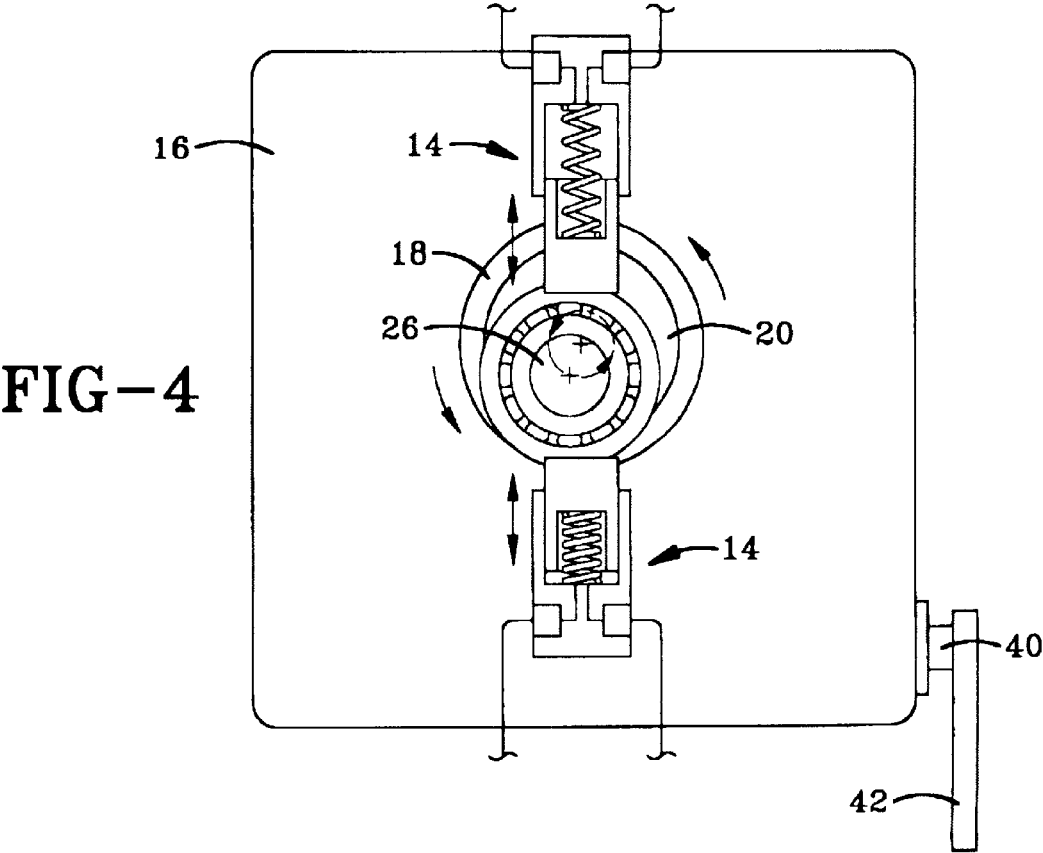
FIG. 4 is a right side elevational view of FIG. 3.
Figure 3:
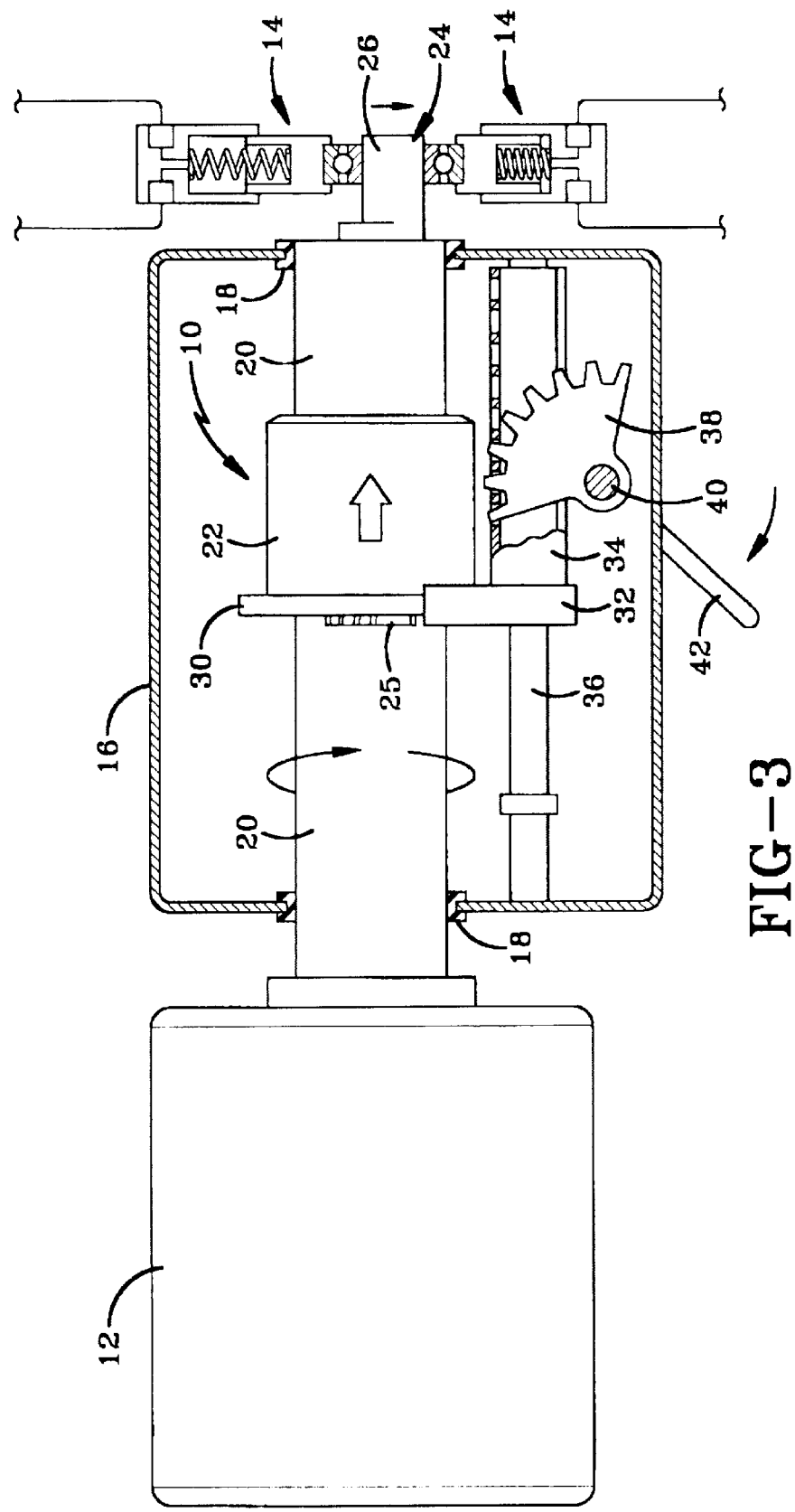
FIG. 3 is a view similar to FIG. 1 showing the crankpin adjusted to a driving position.
Figure 5:
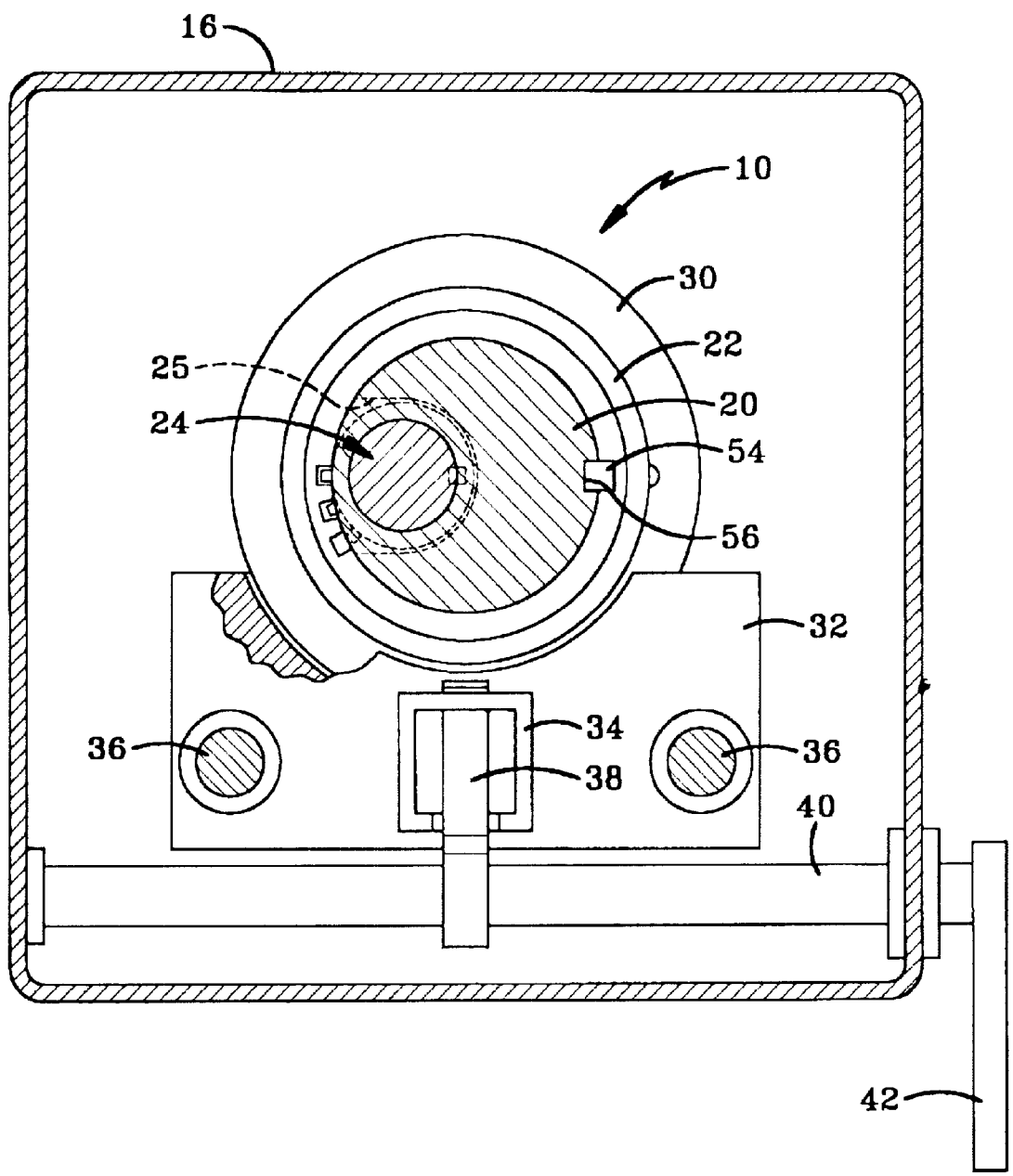
FIG. 5 is a sectional view taken along line 5—5 of FIG. 1.
Figure 6:
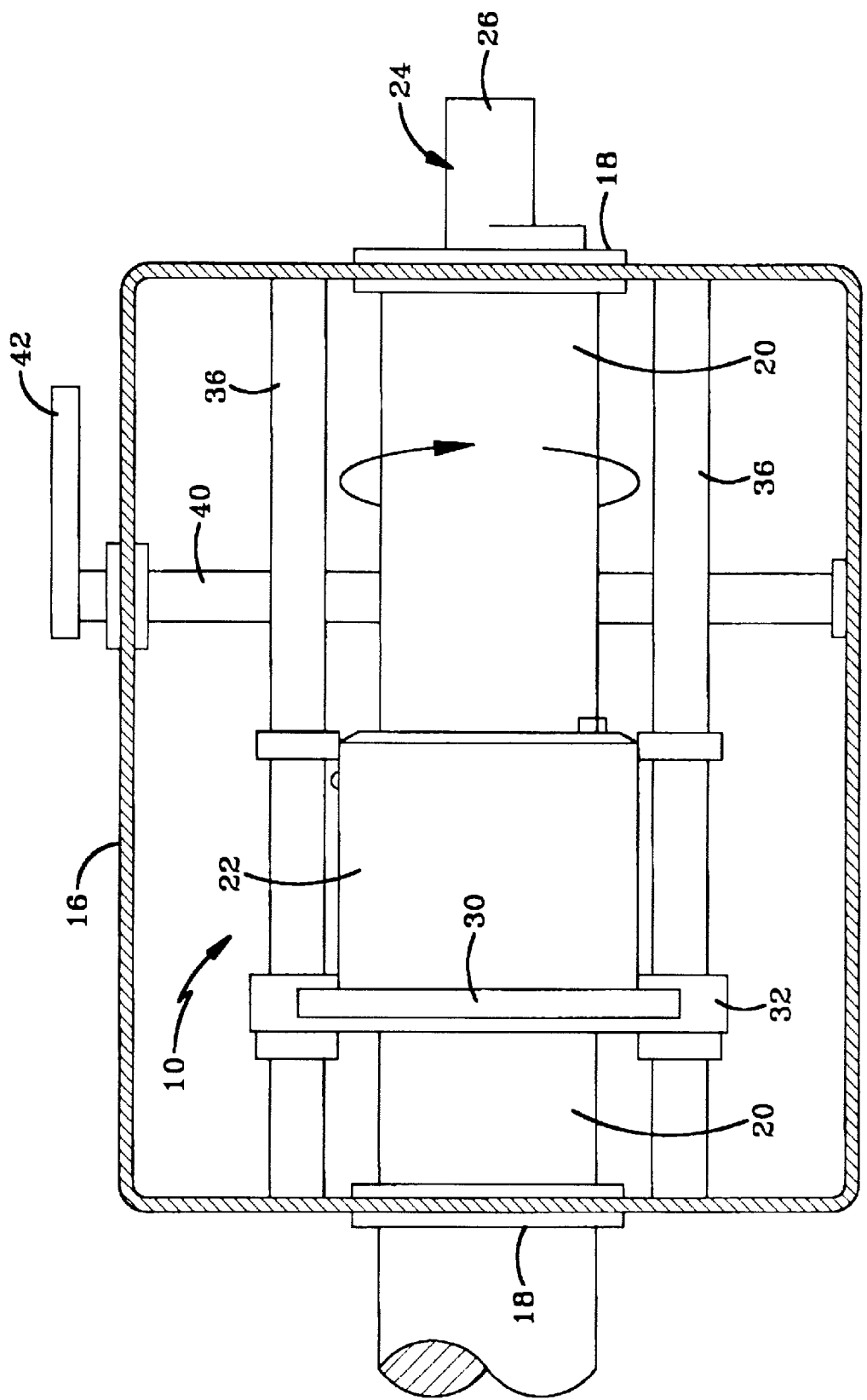
FIG. 6 is a top plan view of the crankshaft assembly of the present invention with the housing broken away.
Figure 7:
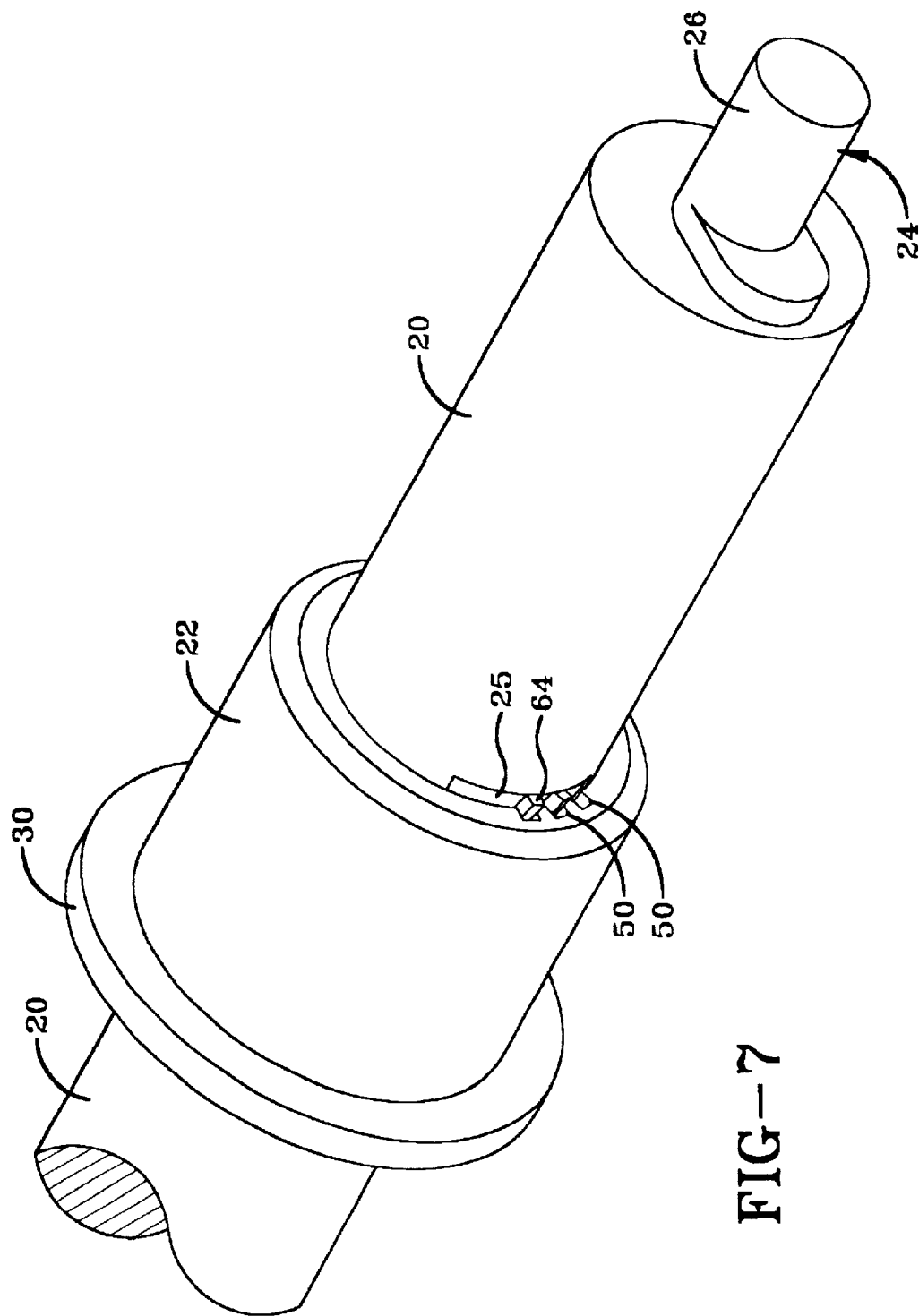
FIG. 7 is a perspective view of the crankshaft assembly of the present invention.
Figure 8:
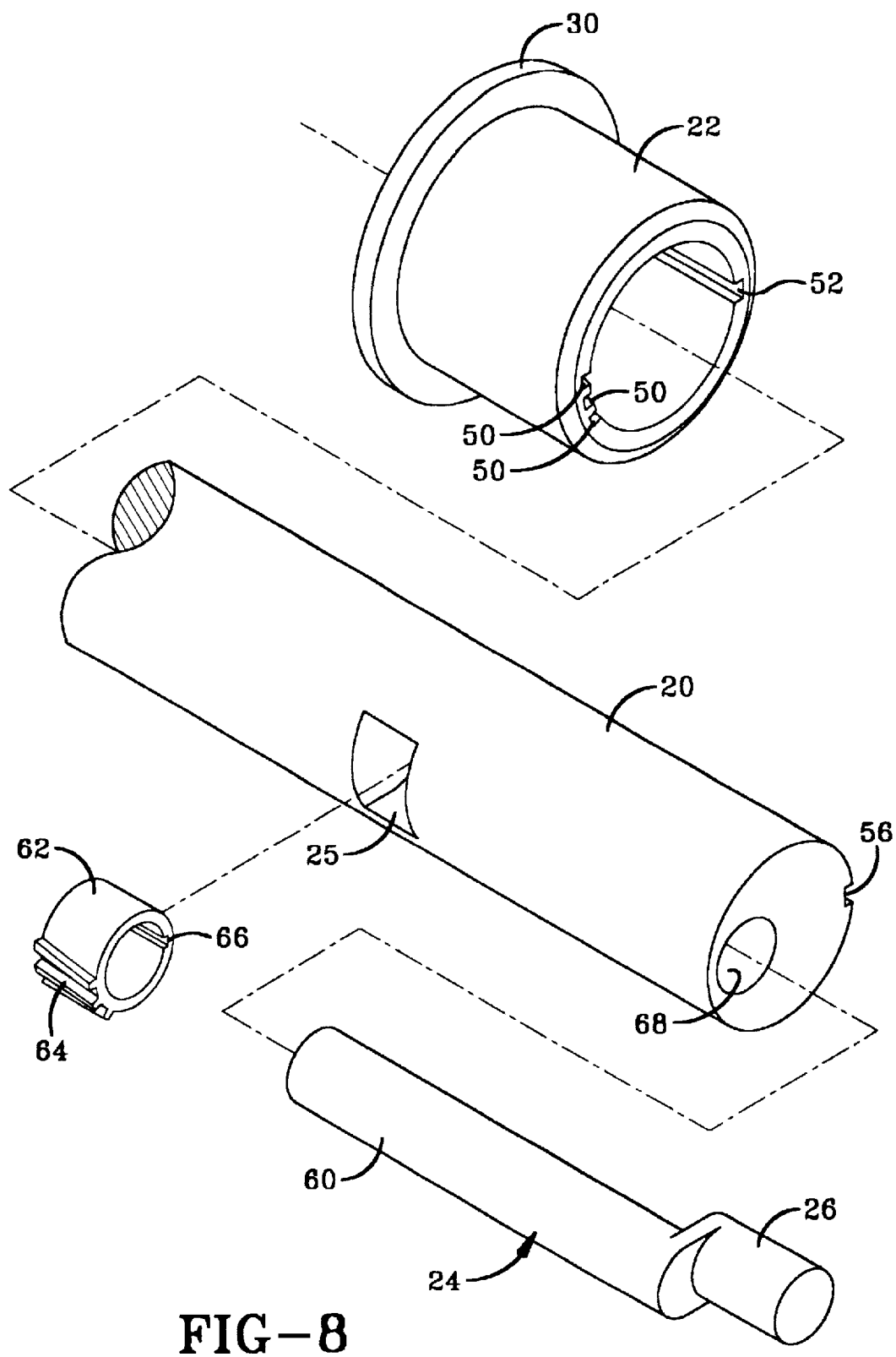
FIG. 8 is an exploded view of the crankshaft assembly of the present invention.
Figure 14:
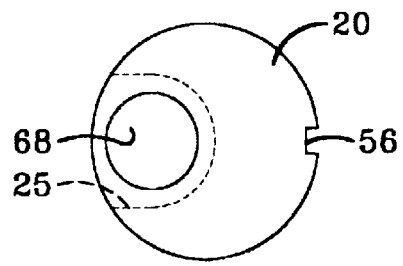
FIG. 14 is a right side elevational view of the drive shaft of FIG. 15.
Figure 15:
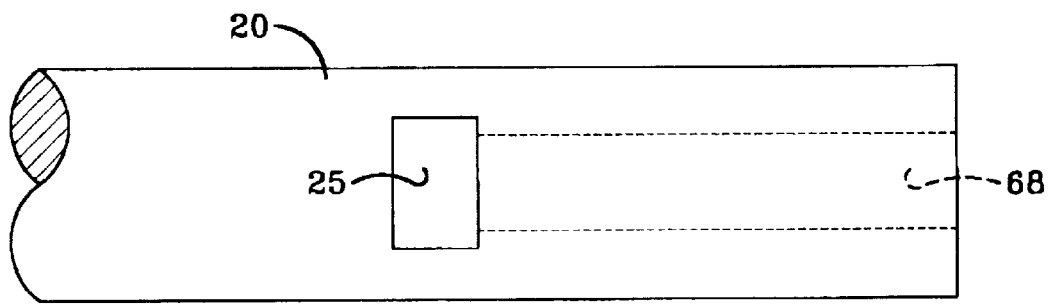
FIG. 15 is a front elevational view of the drive shaft.
Figure 16:
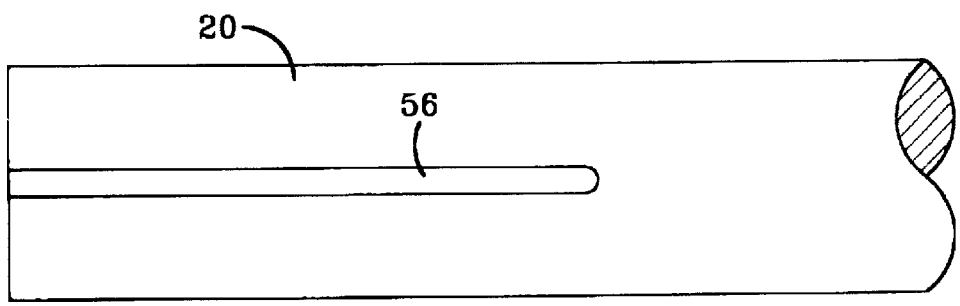
FIG. 16 is a rear elevational view of the drive shaft.
Figure 19:
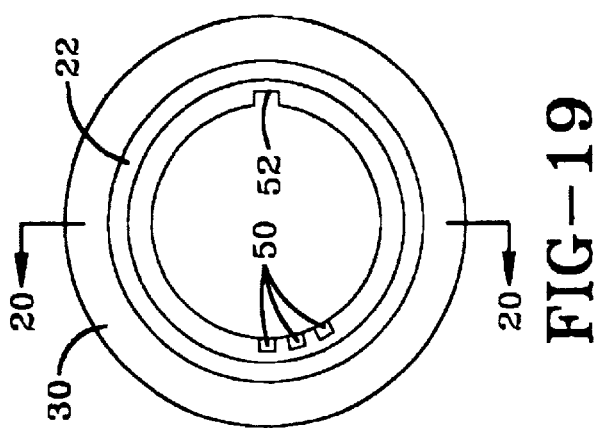
FIG. 19 is a right side elevational view of FIG. 17.
Figure 17:
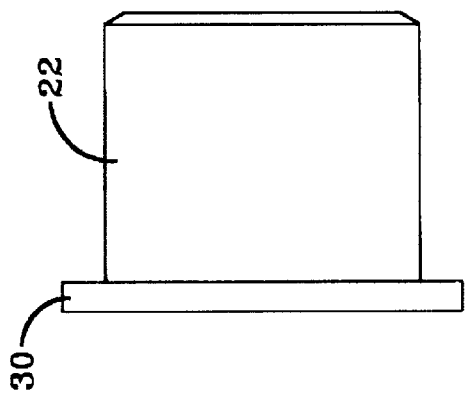
FIG. 17 is a front elevational view of the sleeve.
Figure 20:
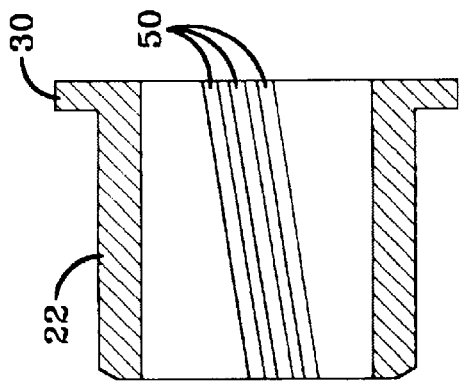
FIG. 20 is a sectional view taken along line 20—20 of FIG. 19.
Figure 18:
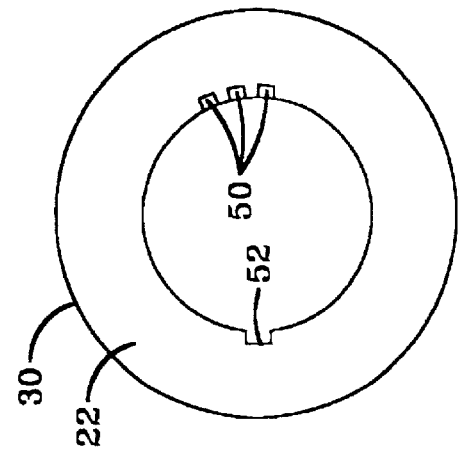
FIG. 18 is a left side elevational view of FIG. 17.

The crankshaft assembly of the present invention is indicated generally by the numeral 10 in the accompanying drawings. Crankshaft assembly 10 is shown in the figures connected to a rotational power source 12 such as a conventional gas or electric motor 12. Motor 12 rotates crankshaft 10 which, in turn, drives a single, or a plurality of piston assemblies 14 or connecting arms 14. In accordance with the objectives of the present invention, crankshaft assembly 10 allows the stroke of piston assemblies 14 to be selectively adjusted while crankshaft 10 is in use. In the preferred embodiment of the invention, the stroke of piston assemblies 14 may be adjusted from a maximum stroke to a minimum stroke of zero.

In the embodiment of the invention depicted in the drawings, crankshaft assembly 10 is disposed in a housing 16. Crankshaft assembly 10 is supported in housing 16 with a pair of bearings 18 that preferably forms seals that prevent lubricants from leaking out of housing 16. In other embodiments, crankshaft assembly 10 may be located outside of a housing or motor 12 may be disposed inside housing 16.

Crankshaft assembly 10 generally includes a drive shaft 20 that is connected to motor 12. A sleeve 22 preferably surrounds a portion of drive shaft 20. Sleeve 22 engages a crankshaft 24 through a window 25 formed in drive shaft 20. Crankshaft 24 includes a crankpin 26 that drives piston assemblies 14. In accordance with the objectives of the invention, sliding movement of sleeve 22 relative to drive shaft 20 adjusts the position of crankpin 26 relative to drive shaft 20.

In the preferred embodiment of the invention, sleeve 22 includes a flange 30 that is seated in a shifting block 32. Block 32 includes a slot that seats approximately one-third of the circumference of flange 30. Block 32 does not rotate and sleeve 22 thus rotates with respect to block 32. Block 32 is attached to a rack 34 that is slidably mounted on a pair of rails 36. Rack 34 engages a pinion gear 38 that is pivotly mounted on a pivot shaft 40. A handle 42 extends out of housing 16 to allow the user to move rack 34 and thus sleeve 22. Rails 36 may be mounted to housing 16 or may be independently supported.

Sleeve 22 defines at least one slot 50 but preferably a plurality of inwardly-facing slots 50. Slots 50 are angled with respect to the longitudinal centerline of sleeve 22 as shown in FIGS. 20, 21, 23, and 25. Sleeve 22 also defines an inwardly-facing longitudinal keyway 52 that is configured to receive a key 54 that connects sleeve 22 to drive shaft 20. Key 54 is disposed in a keyway 56 formed in drive shaft 20. Key 54 allows motor 12 to rotationally drive sleeve 22.

Crankshaft 24 generally includes a main shaft 60 connected to crankpin 26. Crankshaft 24 also includes a drive gear 62 disposed on the opposite end of main shaft 60 from crankpin 26. Drive gear 62 extends through window 25 and engages inwardly-facing slots 50 of sleeve 22 to form a connection between crankshaft 24 and sleeve 22. As described above, sleeve 22 rotates with drive shaft 20 thus causing crankshaft 24 to rotate with drive shaft 20.

Drive gear 62 includes outwardly-facing gear teeth 64 configured to meshingly engage the teeth that define slots 50. The angled configuration of slots 50 causes drive gear 62 to rotate when sleeve 22 is slid back and forth as depicted in FIGS. 21–25.

Figure 21:
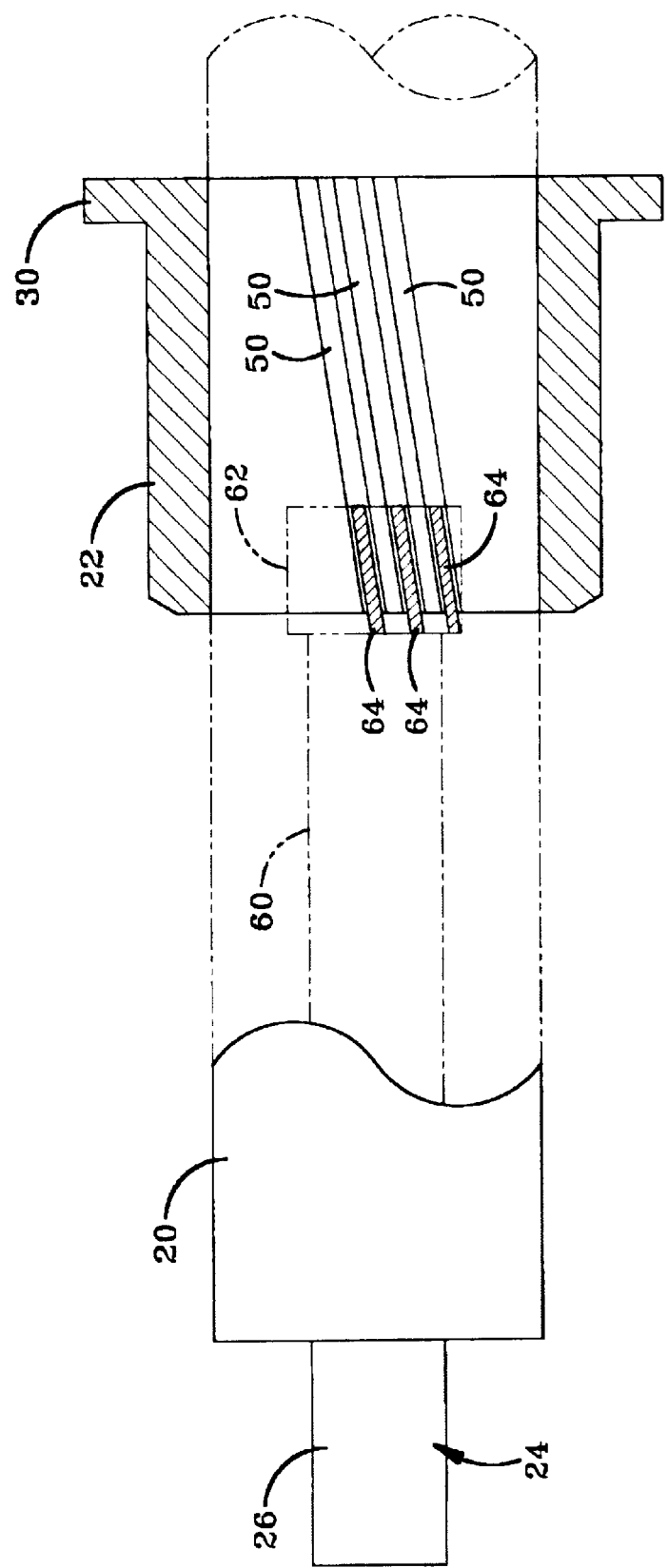
FIG. 21 is a view of the crankshaft assembly of the present invention with elements broken away to show the gear interaction.
Figure 22:
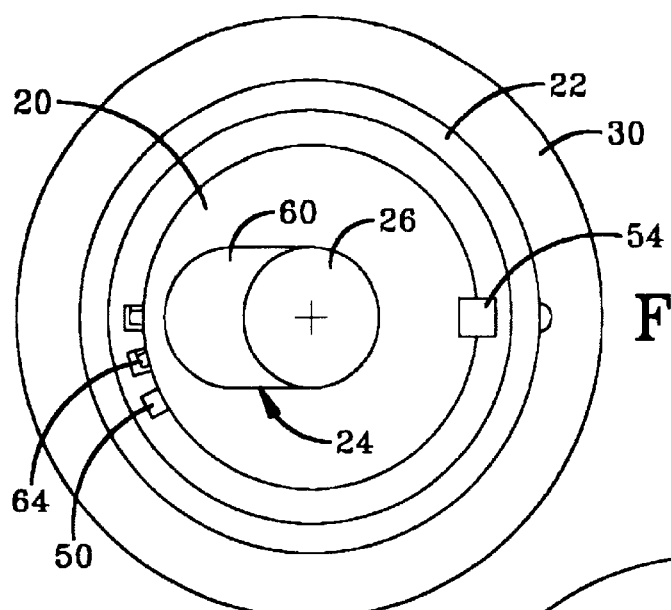
FIG. 22 is an end view of the crankshaft assembly showing the crankpin centered with respect to the drive shaft.
Figure 24:
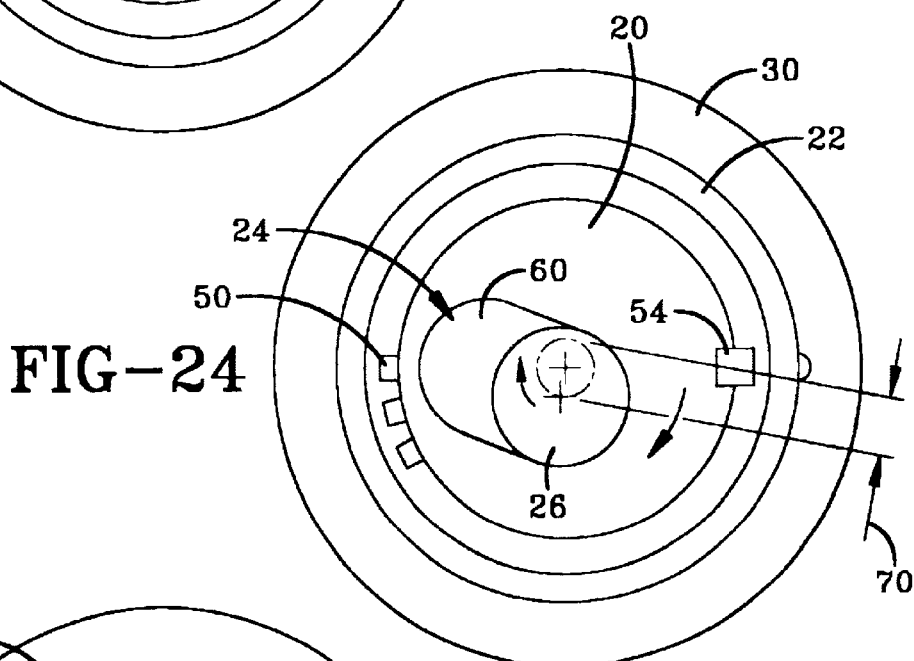
FIG. 24 is a view similar to FIG. 22 showing the crankpin moved away from the center position.
Figure 26:
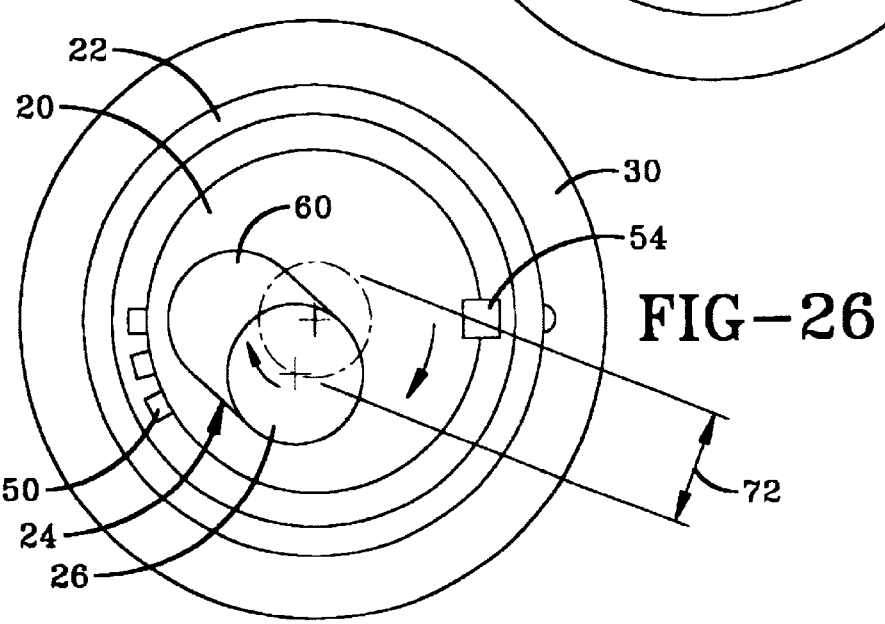
FIG. 26 is a view similar to FIG. 22 showing the further adjustment of the crankpin.
Figure 23:
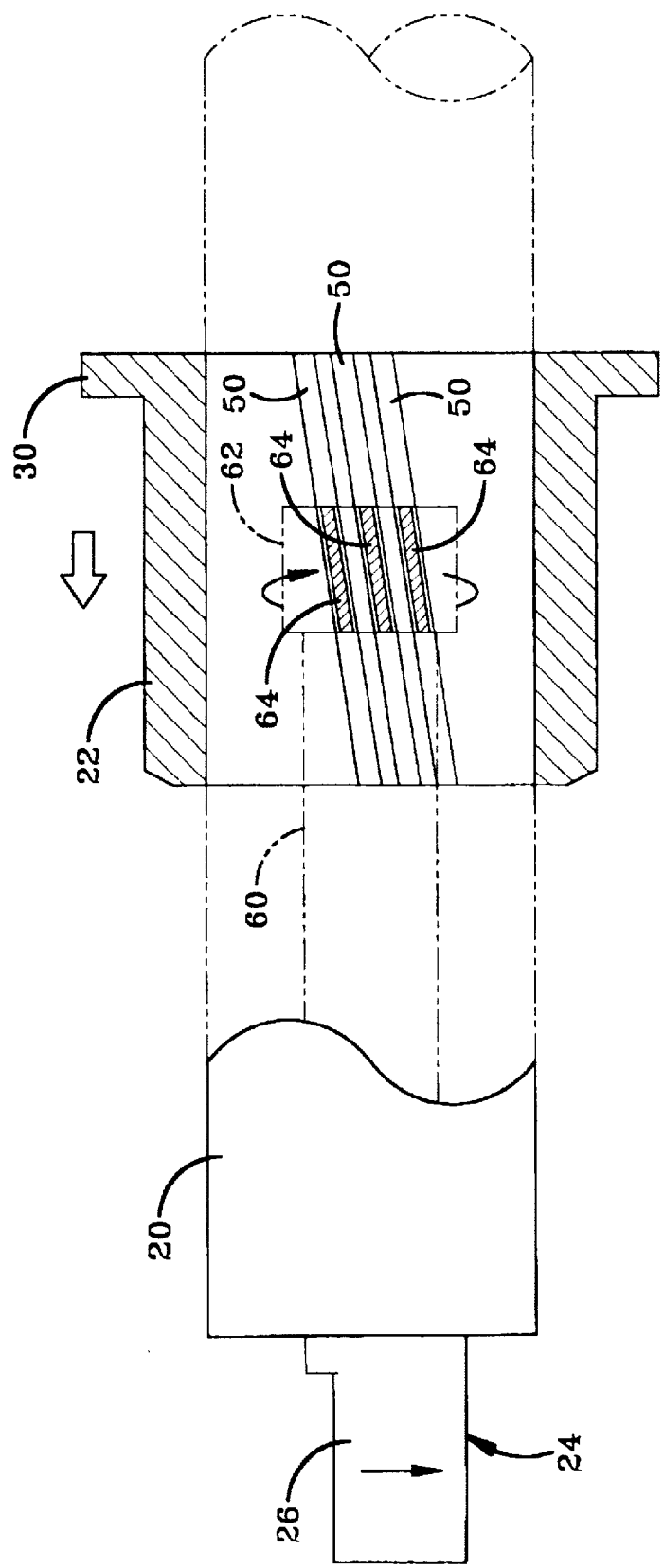
FIG. 23 is a view similar to FIG. 21 showing the adjustment of the crankpin.
Figure 25:
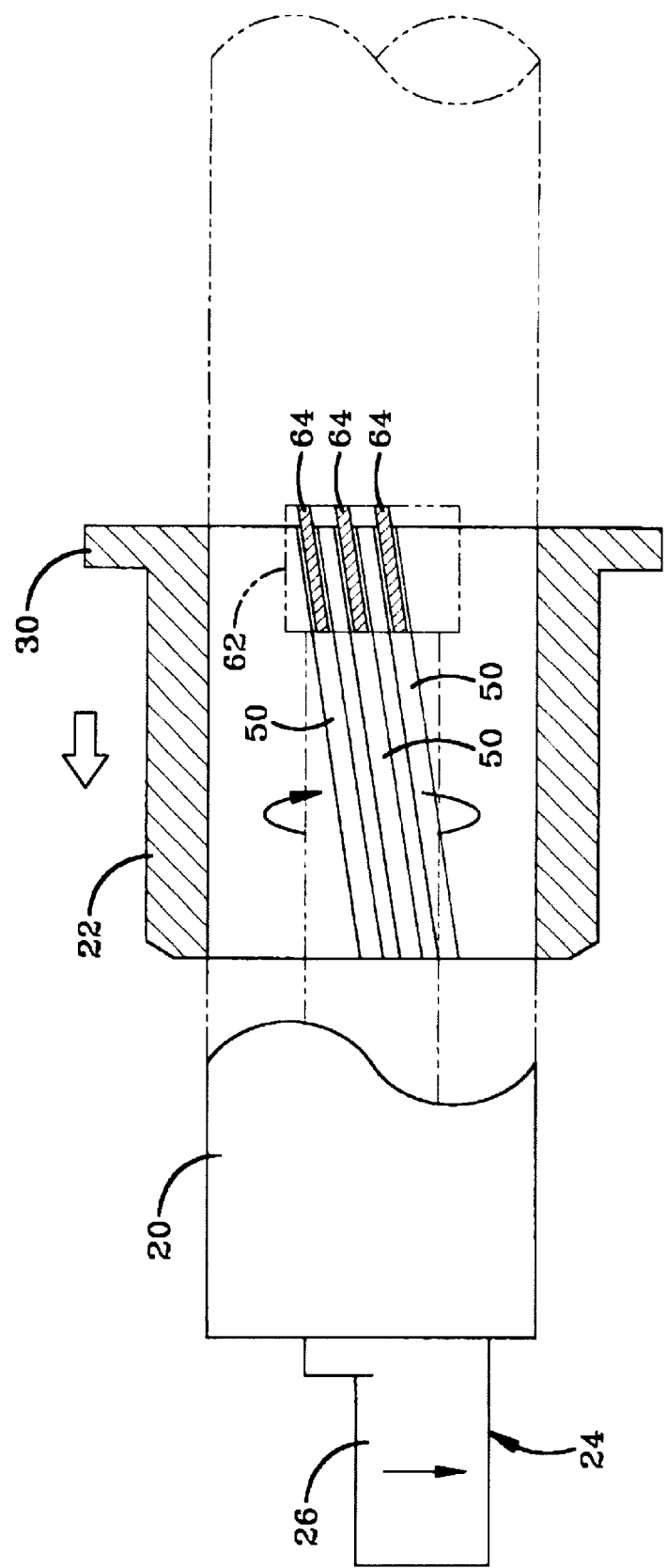
FIG. 25 is a view similar to FIG. 21 showing further adjustment of the crankpin.

The rotation of drive gear 62 causes main shaft 60 of crankshaft 24 to rotate. Crankpin 26 is offset with respect to main shaft 60 and rotation of main shaft 60 thus causes crankpin 26 to pivot with respect to the longitudinal axis of main shaft 60. In the preferred embodiment of the invention, the distance between the longitudinal centerline of crankpin 26 and the longitudinal centerline of main shaft 60 is equal to the distance between the longitudinal centerline of main shaft 60 and the longitudinal centerline of drive shaft 20. Thus, crankpin 26 may be adjusted to be concentric with drive shaft 20 such that it produces a crank stroke of zero as depicted in FIGS. 21 and 22. Movement of sleeve 22 as depicted in FIGS. 23 and 24 causes crankpin 26 to pivot with respect to main shaft 60 and create a crank stroke 70 as depicted in FIG. 24. Further movement of sleeve 22 as depicted in FIG. 25 increases the crank stroke to the distance indicated by numeral 72 as depicted in FIG. 26.

Drive gear 62 may be connected to main shaft 60 by an appropriate key and keyway combination 66. Main shaft 60 is slidably and rotatably disposed in a boar 68 defined by drive shaft 20. The longitudinal centerline of bore 68 is preferably offset with respect to the longitudinal centerline of drive shaft 20.

Crankshaft assembly 10 is thus adjusted by sliding sleeve 22 back and forth with respect to drive shaft 20. Sliding movement of sleeve 22 causes gear teeth 64 to engage slots 50 and rotate crankshaft 24 with respect to drive shaft 20. Rotation of crankshaft 24 causes crankpin 26 to move with respect to the longitudinal centerline of drive shaft 20 and increase or decrease the crank stroke created by crankshaft assembly 10. The configuration of slots 50, gear teeth 64 and the offset between main shaft 60 and crankpin 26 determines the amount of the adjustment and the relation between the amount sleeve 22 slides compared to the movement of crankpin 26.

Accordingly, the improved variable stroke crank shaft assembly apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the variable stroke crank shaft assembly is constructed and used, the characteristics of the construction, and the advantageous new and useful results obtained; the new and useful structures, devices, elements, arrangements, parts, and combinations are set forth in the appended claims.

What is claimed is:

1. A variable stroke crankshaft assembly comprising:

a drive shaft having a rotational axis;

the drive shaft having a first end and a second end;

the drive shaft defining a longitudinal bore having a centerline;

the longitudinal bore having a first end and a second end;

the first end of the longitudinal bore positioned at the first end of the drive shaft;

the centerline of the longitudinal bore being offset from the rotational axis of the drive shaft;

the drive shaft defining a window at the second end of the longitudinal bore;

a sleeve disposed around a portion of the drive shaft;

the sleeve having an inner surface;

the sleeve being slidably mounted on the drive shaft;

the sleeve defining at least one angled slot on its inner surface;

the slot being disposed over the window;

a crankshaft disposed in the longitudinal bore of the drive shaft;

the crankshaft including at least one gear tooth projecting out of the window of the drive shaft;

the gear tooth of the crank shaft being disposed in the at least one angled slot of the sleeve;

the crankshaft having a crankpin;

the crankpin having a longitudinal axis; and the crankpin being offset from the longitudinal axis of the a main shaft of the crankshaft.

2. The assembly of claim 1, wherein the offset distance is equal to the distance between the rotational axis of the drive shaft and the longitudinal axis of the main shaft of the crankshaft.

3. The assembly of claim 1, wherein the sleeve includes a flange projecting radially outwardly from the sleeve.

4. The assembly of claim 3, further comprising a shifting block having a slot; a portion of the flange being disposed in the slot.

5. The assembly of claim 4, further comprising at least one rail; the shifting block being slidably mounted to the rail.

6. The assembly of claim 5, further comprising a rack connected to the shifting block; a pinion gear meshingly engaging the rack; and a hand lever connected to the pinion gear such that pivoting movement of the hand lever causes the shifting block to move.

7. The assembly of claim 6, further comprising a housing; shifting block and sleeve being disposed inside the housing and at least a portion of the hand lever being disposed outside of the housing.

8. The assembly of claim 1, further comprising a source of rotational movement connected to one end of the drive shaft.

9. The assembly of claim 1, wherein the crankshaft includes a plurality of gear teeth projecting radially outwardly through the window in the drive shaft.

10. The assembly of claim 9, wherein the sleeve defines a plurality of angled slots.

11. The assembly of claim 1, wherein the crankpin may be adjusted to be concentric with the drive shaft such that the crankshaft assembly has a crank stroke of zero.

12. The assembly of claim 1, wherein the sleeve rotates with the drive shaft.

13. The assembly of claim 12, wherein the sleeve is keyed to the drive shaft.

14. The assembly of claim 1, wherein an increased angle between the longitudinal axis and the angle of the slot in the sleeve decreases the amount the sleeve must be moved to obtain a change in the stroke of the assembly.

15. A variable stroke crankshaft assembly comprising:

a drive shaft having a rotational axis;

a sleeve surrounding a portion of the drive shaft;

the sleeve being slidably mounted on the drive shaft and connected to the drive shaft so that the sleeve rotates with the drive shaft;

a crankshaft carried by the drive shaft;

the crankshaft having a main shaft having a longitudinal axis that is offset from the rotational axis of the drive shaft;

the crankshaft engaging the sleeve;

the crankshaft having a crankpin offset from the longitudinal axis of the drive shaft; and sliding movement of the sleeve rotating the crankshaft to pivot the crankpin and thus change the stroke of the crankshaft assembly.

16. The assembly of claim 15, further comprising means for sliding the sleeve with respect to the drive shaft.

17. The assembly of claim 15, wherein the connection between the sleeve and crankshaft is a geared connection wherein the gear teeth are angled.

18. The assembly of claim 17, wherein the drive shaft includes a longitudinal bore and a window extending between the outer surface of the drive shaft and the bore; the crankshaft being at least partially carried by the drive shaft in the bore.

19. The assembly of claim 18, wherein the crankpin may be adjusted to be concentric with the drive shaft so that the crank stroke is zero.

* * * * *